May 26, 1942. J. F. CULLIN 2,284,373
MACHINE FOR CONNECTING LEADS OF ARMATURE COILS TO COMMUTATORS
Filed Nov. 22, 1939 3 Sheets-Sheet 2
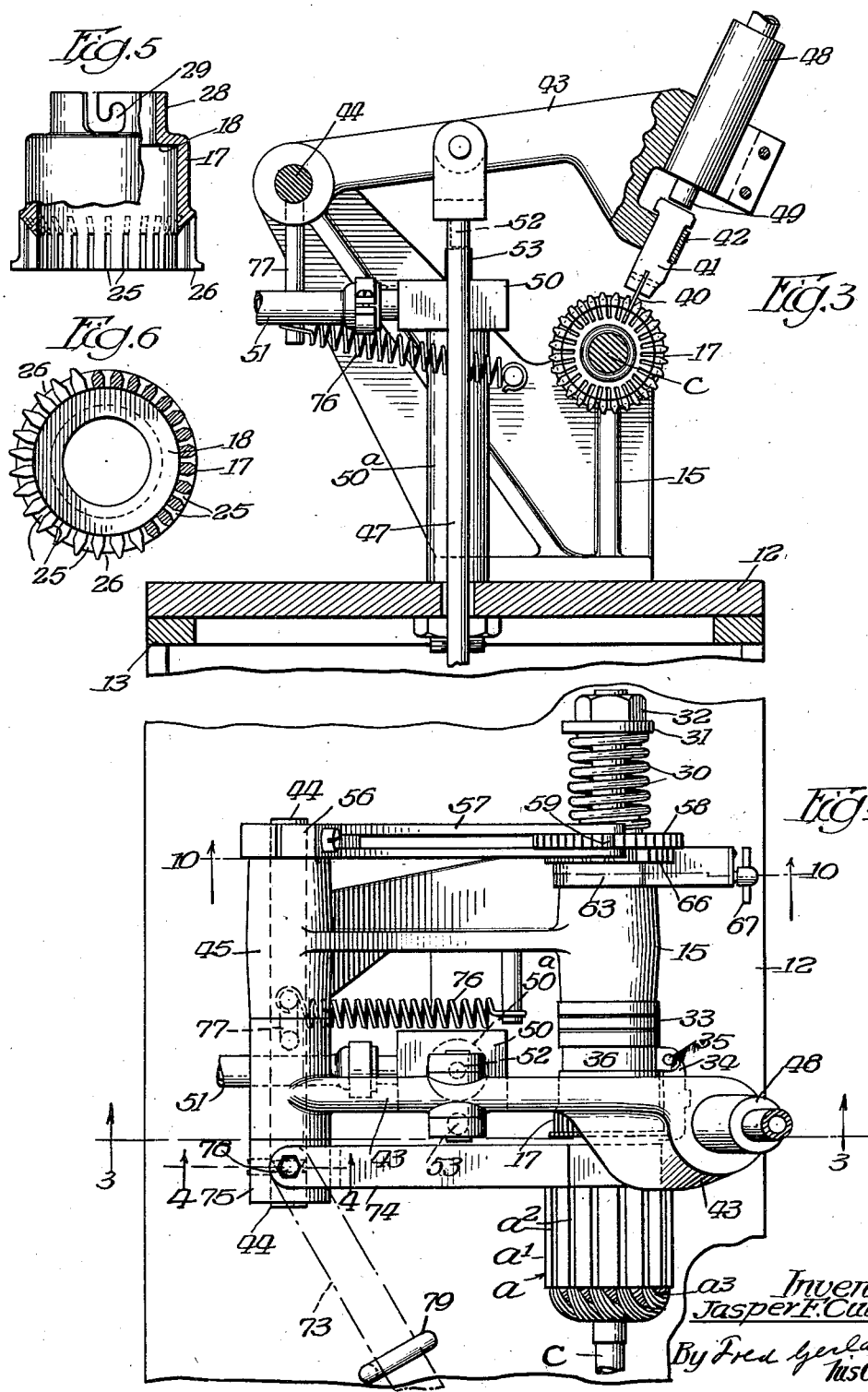

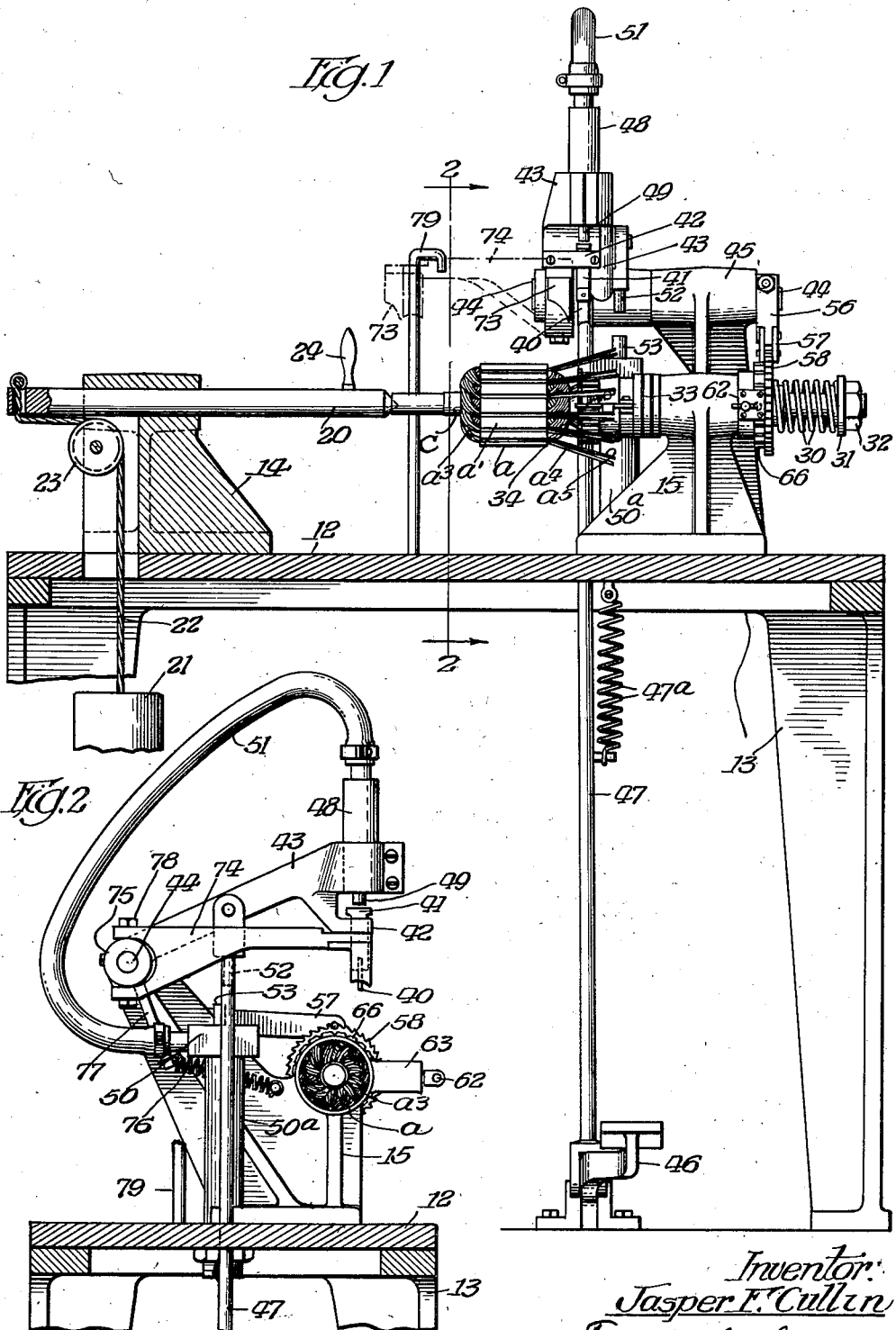

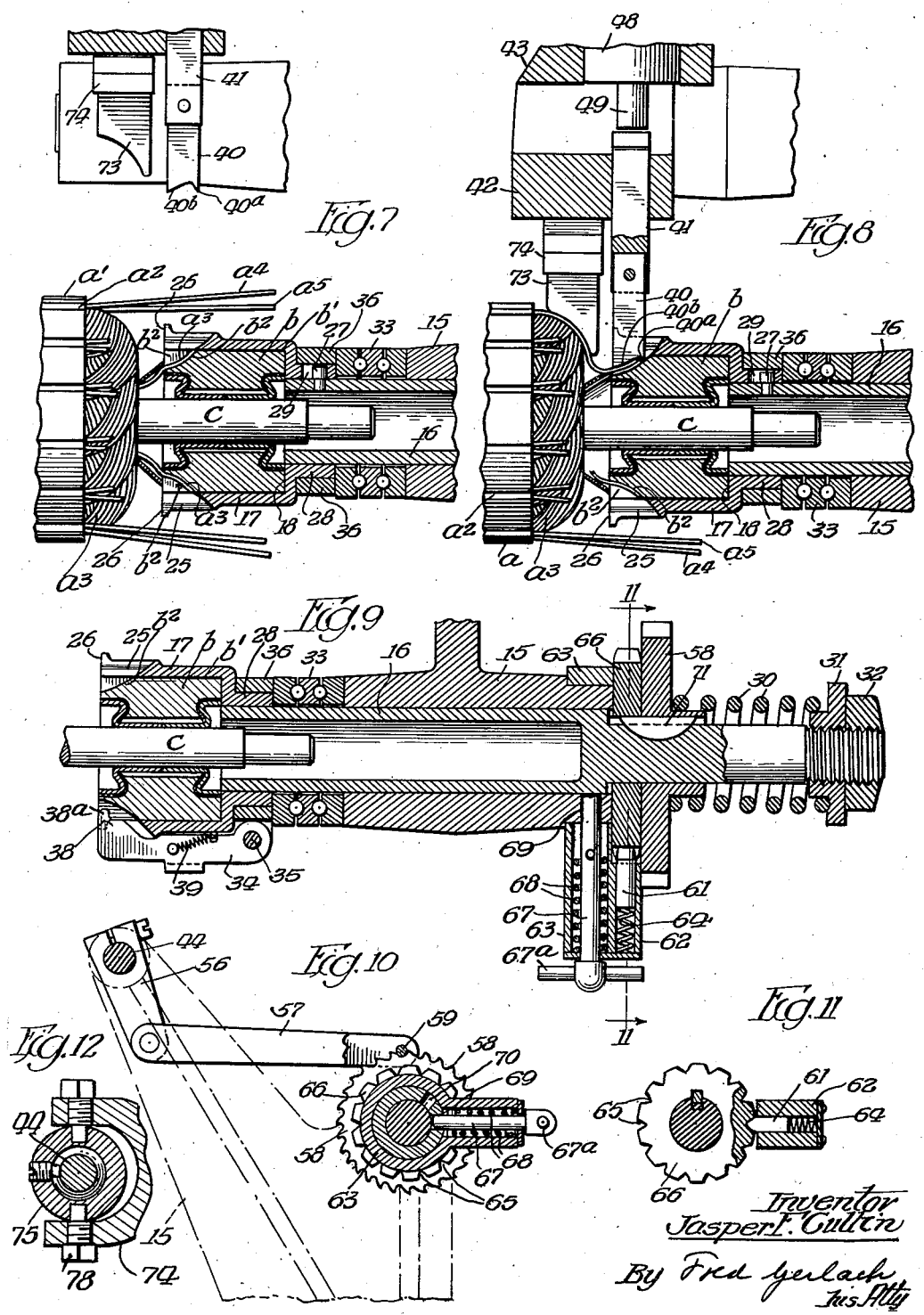

Patented May 26, 1942

2,284,373

UNITED STATES PATENT OFFICE 2,284,373

MACHINE FOR CONNECTING LEADS OF ARMATURE COILS TO COMMUTATORS

Jasper F. Cullin, Detroit, Mich., assignor of two-thirds to Lou Mervis, Lock Haven, Pa.

Application November 22, 1939, Serial No. 305,677

8 Claims. (Cl. 29—84)

The invention relates to machines for connecting leads of armature-coils to commutators.

In some types of electrical machines such as generators, form-wound coils placed in slots of the armature-core and one inner lead and one outer lead from each coil are connected to slots in the commutator segments which are insulated from one another, and the segments are equal in number to the number of coils or twice the number of the slots in the armature-core.

In assembling this type the inner or lower leads from the coils are first connected to the slots in the commutator segments and insulated from one another between the segments and the coils and thereafter the upper or outer series of leads are connected to the slots in the segments and insulation is provided for the leads between the segments and the coils.

One object of the invention is to provide an improved machine for connecting or assembling the leads on the armature-coils with the commutator segments, which is simple in construction and can be quickly operated to expedite the assembling operation.

Another object of the invention is to provide a machine whereby the connecting operations for the top leads of the coils will be expedited by providing means for connecting one series of alternating leads to alternate segments, so that the insulation can be applied to the leads between the segments and the coils, and then connecting the other series of alternating leads to the commutator segments or bars.

Another object of the invention is to provide a former for the leads between the commutator segments and the coils, which is operable conjointly with the mechanism for connecting the leads to the commutator.

Another object of the invention is to provide a machine for quickly and efficiently connecting the top leads of the armature to the commutator and cutting off the excessive ends of the leads.

Other objects of the invention will appear from the detailed description.

The invention consists in the several novel features which are hereinafter set forth and are more particularly defined by claims at the conclusion hereof.

In the drawings: Fig. 1 is a front elevation of a machine embodying the invention, parts being shown in section. Fig. 2 is a vertical transverse section taken on line 2—2 of Fig. 1. Fig. 3 is a section taken on line 3—3 of Fig. 4. Fig. 4 is a plan of a portion of the machine. Fig. 5 is a plan, partly in section, of the sleeve in which the commutator is held. Fig. 6 is an end view, partly in section, of said sleeve. Fig. 7 is a longitudinal section through the mechanism for rotatably supporting the commutator for the insertion of successive leads from the coils of the armature, the inserting blade and former for the leads being shown in inoperative position. Fig. 8 is a similar view illustrating the inserting blade and former for the leads in operative position. Fig. 9 is a section taken on line 9—9 of Fig. 7. Fig. 10 is a section on line 4—4 of Fig. 4. Fig. 11 is a section on line 11—11 of Fig. 9. Fig. 12 is a detail section on line 12—12 of Fig. 4.

The invention is exemplified in a machine which comprises a table or base 12 carried by a frame 13 which is provided with legs for supporting the machine at the desired working elevation. The machine is adapted to removably support a previously assembled armature $a$, commutator $b$ and shaft $c$ for connecting the leads from the armature coils to the commutator segments. The armature comprises a core $a^1$ provided with longitudinal slots $a^2$. One side of a pair of armature-coils $a^3$ is secured in each slot $a^2$ of the armature-core. The commutator comprises segments $b^1$ corresponding in number to the number of coils of the armature and each segment is provided with a slot or notch $b^2$ for receiving one of the inner leads $a^3$ and one of the outer or upper leads from one of the coils. The outer leads $a^4$, $a^5$ from the pair of coils in each armature-slot $a^2$ are connected to slots in alternate commutator segments. The operation of the machine is illustrated for connecting the outer leads $a^4$, $a^5$ to the armature segments after the inner leads $a^3$ have been connected thereto. In connecting the leads from the armature to the commutator, suitable insulation is placed around the inner leads $b^3$ between the commutator and the coils and insulation is placed between the series of outer leads $a^4$ and the series $a^5$ after one of said series has been connected to the armature segments, as well understood in the art.

The armature and commutator assembly is removably supported for rotation during the operation of the machine upon said assembly by a sleeve or hollow head 17 into which the commutator fits and a shaft 20 which engages the outer end of, and centers, the shaft $c$ of the assembly so that the latter will be supported coaxially with said sleeve. Sleeve 17 is carried by a shaft 16 which is journaled in a head-stock 15 adjacent one end of table 12. A tail-stock 14 is secured adjacent one end of the table and a head-stock 15 on the other end of the table. Shaft 20 is slidably mounted in a tail-stock 14 and its inner end is pointed to extend into a socket in the outer end of the shaft $c$ to support said shaft in axial alignment with sleeve 17 and shaft 16. A weight 21 is connected by a cable 22 which is connected to the outer end of shaft 20 and guided by a pulley 23 which is supported in the tail-stock 14 to press the shaft 20 into engagement with shaft $c$ and the outer end of the commutator against wall 18 of sleeve 17 during the operation of the machine. A handle 24 is secured to shaft 20 so the latter can be shifted outwardly to permit endwise movement of the commutator into and out of sleeve 17.

When shaft 20 is shifted outwardly the commutator can be shifted endwise into sleeve 17 for performing the lead connecting operations and after these have been performed the commutator can be withdrawn from the sleeve for connecting the leads of another commutator and armature assembly. The outer end of the commutator is adapted to abut against a shoulder 18 in sleeve 17 and is held in abutting relation with the sleeve by the pressure applied to shaft 20 from weight 21.

Sleeve 17 is provided at its inner end with a series of slots 25 corresponding in number to the commutator segments and adapted to register with the notches $b^2$ in said segments to permit the top or outer leads $a$ from the armature coils to pass into said notches, respectively. The outer portions of the sides of slots 25 are flared or divergent, as at 26, to facilitate the entry of the leads through slots 25 of sleeve 17 and into notches $b^2$ in the armature segments. Sleeve 17 is detachably secured to the inner end of shaft 16 by a bayonet lock which comprises a stud 27 fixed to shaft 16 and a slot 29 in the hub 28 of sleeve 25 which fits around the inner end of shaft 16. A coil-spring 30 engages a washer 31 which is held on the outer end of shaft 16 by a nut 32 to hold the sleeve 17 longitudinally locked to shaft 16 through bayonet lock. An anti-friction thrust-bearing 33 is interposed between the outer end of sleeve 17 and the head-stock 15 in which shaft 16 is journaled. A latch 34 is pivoted at 35 to a collar 36 which is mounted and rotatable on the hub 28 of sleeve 17 and is provided at its free end with an extension 38 which fits in the slots 25 of sleeve 17 and a tooth 38ª which is adapted to pass into any of the notches $b^2$ of the commutator bars to lock the commutator and sleeve together for conjoint rotation. A spring 39 between latch 34 and collar 36 yieldingly holds the latch in its operative position. Latch 34, when in its operative position, serves to lock the armature and the sleeve together for conjoint rotation and to retain the slots $b^2$ in the commutator segments in radial registry with the slots 25 in sleeve 17 during the rotation of the sleeve. Collar 36 is rotatable on the sleeve to permit the latch to be withdrawn at the end of a series of staking operations for driving the lead into the notch $b^2$ in which it has been locked. In connecting the commutator to sleeve 17, the latch is withdrawn and the commutator is rotated in the sleeve until the slots $b^2$ in the commutator register radially with the slots 25 in the sleeve 17. The latch is then released so it will lock the commutator and said sleeve together for conjoint rotation.

Mechanism for driving or staking the leads into the notches $b^2$ of the commutator comprises a blade 40 which is fixed to an anvil 41 which is slidably mounted and has a limited movement in a head 42 on arm 43. Blade 40 is adapted to pass through slots 25 in sleeve 17 and engage and drive the outer leads against the bottom leads in the bottom of slots $b^2$ of the commutator. Arm 43 is mounted on a shaft 44 and to swing in a path which will cause blade 40 to operate successively through slots 25 in sleeve 17. This blade 40 is also adapted to cut the excessive portion of the leads from the portions secured in the commutator slots $b^2$. Blade 40 is provided with a cutting edge 40ª for severing the excessive portion of each lead therefrom and a suitably curved edge 40ᵇ for engaging the lead inwardly of the cutting edge. Shaft 44 is journaled in a bearing 45 which is integral with the head-stock 15. A manually operable pedal 46, which is connected by a link 47 to arm 43, is adapted to swing said arm to impart operative strokes to the blade 40. A spring 47ª is provided to retract arm 43 and pedal 46.

In practice, it is desirable to drive or stake each lead into the armature segments so they will be effectively connected thereto and secured therein. For this purpose a high-speed pneumatic hammer such, for example, as those used for riveting, is provided to impart a succession of strokes to blade 40 through anvil 41. These hammering strokes also serve to impart blows to the blade for severing the excessive portion from the leads. This hammer is automatically controlled to operate the blade 40 after the latter has forced the lead through slot 25 in sleeve 17 and approximately to its lowest point in the notch $b^2$ of the commutator. The hammer comprises a cylinder 48 which is fixedly mounted in the front end of arm 43 and a plunger 49 operated by fluid in said cylinder and adapted to strike and impart blows to the upper end of anvil 41 to which blade 40 is secured. Anvil 41 has sufficient lost-motion in head 42 of arm 43 to cause the head to lower blade 40 with arm 43 during the down-stroke of the arm until the lead has been placed in slot $b^2$ of a commutator segment and to render the anvil operative by plunger 49 during the end of the down-stroke of arm 43.

A valve 50 of suitable construction controls the flow of air through a flexible pipe 51 to cylinder 48. The casing of valve 50 is stationarily supported from table 12 by a tube 50ª, to the lower end of which fluid may be supplied from a suitable source. The automatically closing controlling element of valve 50 is provided with an upstanding pin 53 which is adapted to be engaged by a stud 52 which is carried by the link 47 which operates arm 43. When arm 43 is lowered by the operation of pedal 46 and after blade 40 has been lowered to place the lead in a slot $b^2$ of the commutator, stud 52 will engage and depress pin 53 to open valve 50 so that compressed air will pass to cylinder 48 and impart a succession of blows to plunger 49. During the initial portion of the upstroke of arm 43, stud 52 will release pin 53 to permit valve 50 to close and automatically cut off the supply of air to cylinder 48.

During each downward stroke of arm 43 by pedal 46 and link 47, arm 56 will impart an idle backward stroke to link 57 and pin 59. During the upstroke of arm 43, pin 59 will be operated to rotate ratchet 58 a distance corresponding to the pitch between two ratchet teeth, which will move the next alternate slot 25 in sleeve 17 into position to be entered by the blade 40 during the succeeding downward stroke.

After a lead has been connected to a commutator segment and its excessive end has been severed therefrom and blade 40 has been withdrawn from sleeve 17, shaft 16, sleeve 17 and the assembly comprising the commutator, armature and shaft c, are rotated and indexed one step of a sufficient distance to bring the second succeeding slot 25 in sleeve 17 of the slot $b^2$ registering therewith into position for securing an outer lead from the same series into the commutator by the next downward stroke of blade 40. A positioning dog 61 which is pressed by a spring 64, is slidably mounted in a lug 62 formed on a collar 63 which is normally stationarily held on headstock 15. The inner end of dog 61 is V-shaped and engages corresponding V-shaped notches 65 in a wheel 66 to accurately position the sleeve 17 and commutator at predetermined points corresponding to the strokes of the ratchet 56 to position and retain alternate slots 25 of sleeve 17 into position for the entry of the blade 40 into such slots. The notches 65 are spaced apart correspondingly to a pair of teeth of ratchet wheel 58. At the end of each indexing of the ratchet 58, dog 61 will accurately position shaft 16 and sleeve 17 for the entry of blade 40 into the slots 25 of sleeves 17.

Notched wheel 66 and ratchet 58 are connected to shaft 16 by a spline 71 on which said wheels are slidable so that spring 31 which engages ratchet wheel 58 will be effective to hold the pin 29 longitudinally to prevent the sleeve 17 from becoming unlocked from shaft 16.

In connecting the outer leads to the commutator segments, the leads $a^4$ from the outer sides of one coil of the pair of coils in each of the slots in the armature-core, are successively connected to and secured in alternate slots $b^2$ of the commutator-segments and then the outer leads $a^5$ from the outer sides of the other series of coils in the armature slots are successively connected to the slots $b^2$ in the alternating segments of the commutator. Suitable insulation is applied between the two series of leads $a^4$, $a^5$ and between the commutator and the adjacent ends of the coils. For the purpose of connecting the leads in this manner, a device is provided for setting sleeve 17 so the alternate slots 25 will be cooperatively positioned in the path of blade 40 for the successive staking of the outer leads in alternate slots $b^2$ of the commutator. This device comprises a collar 63 which is rotatably mounted on one end of head-stock 15, a pin 67 which is slidably mounted in collar 63, a spring 68 applied to press pin 67 inwardly to project into either of holes 69, 70 in the head-stock 15 to alternately set the positioning dog 61 and ratchet 58 for positioning the slots 25 in sleeves 17 for inserting the leads into either of the alternate series of slots 25 by blade 40. Pin 67 is provided with a handle 67a. By withdrawing the pin against the force of spring 68 from hole 69 in head-stock 15, and rotating the collar 63 to bring pin 67 into alignment with hole 70 and then releasing the pin, sleeve 17, commutator and armature will be set so that during the step-by-step rotation of ratchet 58 the blade 40 will be operative to successively stake the second series of top leads into the alternate slots $b^2$ into which no leads were secured during the operations of blade 40 to stake the first series of leads into the armature-segments. This mechanism exemplifies means for setting the sleeve rotating mechanism for connecting one series of top leads to alternate commutator-segments and after these have been connected, for connecting the second series of top leads into the intermediate segments.

In practice, it is desired to shape or form the portions of the leads between the commutator and the adjacent end of the armature-coils to provide a better surface for the insertion of insulation and also for balance. For this purpose, a former 73 is provided to act upon the leads toward the end of the downward strokes of blade 40. This former has a curved end to conform to the desired shaping of the lead between the commutator and armature side and is secured to an arm 74 which is pivotally movable around shaft 44 so the former can swing with the head 42 and arm 43. Arm 74 is pivoted to a collar 75 which is rotatable on and held against longitudinal movement on shaft 44. Head 42 on arm 43 is adapted to abut against arm 74 so that when arm 43 is lowered the former 73 will be lowered with blade 40 and bend the lead during the latter part of the downward stroke of blade 40, as illustrated in Fig. 6. Arm 74 is held in abutting relation with guide 42 by a spring 76 which is connected to a pin 77 projecting downwardly from collar 75. The rear end of arm 74 is pivoted to collar 75 so that said arm can be swung longitudinally of shaft 44 from its operative engagement with head 42 and secured under a stationary hook 79 when it is desired to operate the arm 43 without the use of the former.

The operation of the machine will be as follows: The previously assembled armature, commutator and shaft c are placed in the machine and, if desired, the inner leads may be connected to the armature-segments and the insulation therefor may be applied in a previous operation. The operator will move centering shaft 20 outwardly in headstock 14 sufficiently to permit commutator b to be inserted endwise into sleeve 17 and the projecting end of the shaft c to extend into the shaft 16. When the commutator has been inserted in the sleeve, the leads $a^4$, $a^5$ will lap or project longitudinally over the sleeve 17. Shaft 20, when released, will be shifted by weight 21 into engagement with one end of armature shaft c and hold the commutator in sleeve 17 so that the assembly will be supported coaxially with sleeve 17 and shaft 16. During the insertion of the commutator in sleeve 17, latch 34 will be held outwardly. When the commutator has been placed in the machine, the commutator will be rotated in the sleeve to bring the slots $b^2$ in the armature-segments into radial registry with the slots 25 in the sleeve and latch 34 will be released so it will pass through one of the slots 25 and project into the registering slot $b^2$. This will lock the commutator and armature to the sleeve 17 for rotation therewith. Spring 30 will press sleeve 17 endwise to retain the bayonet-catch 28, 29 so it will lock shaft 16 and sleeve 17 against inward longitudinal movement. The operator will then release arm 74 from hook 79 and swing it into abutting relation with head 42 of arm 43. The operator will then manually press the proper top lead $a^4$ into the slot 25 into which the blade 40 will pass when it is lowered and then depress pedal 46 and thereby impart a downward stroke to arm 43. The blade 40 carried by the arm will, during the downward stroke, engage the lead in the slot 25 in which it has been placed and force the lead downwardly through said slot and into the slot $b^2$ in the commutator. As blade 40 approaches the end of its downstroke, pin 52 will strike valvepin 53 to open valve 50 for supplying air to operate the pneumatic plunger 49 and impart a rapid succession of blows to the anvil 41. These blows will cause the blade 40 to sever the excess wire from the lead and to forcibly drive the lead as far as possible toward the bottom of slot $b^2$ and thus complete the connecting or staking operation. As the blade 40 approaches the lower end of its stroke, former 73 will engage the portion of the inserted lead between the commutator and the end of the armature and shape said portion as desired and illustrated in Fig. 6. The pedal is then released and arm 43 is raised to its normal position. During the downstroke of arm 43, arm 56 will shift link 57 rearwardly a distance slightly greater than that between alternate teeth on ratchet 58 and slots 25 in sleeve 17. During the upstroke of arm 43 imparted by spring 60, arm 56 and link 57 will advance the ratchet 58 two teeth. This advance of the ratchet will rotate the sleeve 17 and the commutator to bring the second next slot 25 and slot $b^1$ into the path of blade 40, this feeding and indexing serving to pass the intermediate slot 25 in sleeve 17. These operations are continued until the entire series of leads $a^4$ has been secured in the slots $b^2$ of alternate commutator-segments. The former may then, if desired, be moved out of abutting relation with arm 43 and latched under hook 79. An insulating collar or other insulation will then be placed around the outer leads $a^4$ which have been secured in the armature-segments. The machine is then set for connecting the leads $a^5$ to the intermediate segments of the commutator by adjustment of collar 63 on headstock 15 to rotate ratchet 58 and notched wheel 66 into position for step-by-step strokes which will bring the slots 25 for said leads successively into operative relation with the blade 40 during the downstrokes of arm 43. For that purpose, pin 67 will be disengaged from hole 69 and collar 63, notched wheel 66, ratchet 58, shaft 16 and sleeve 17 will be rotated relatively to the head-stock 15, and pin 67 will be locked in hole 70, so that the alternate slots into which no leads have been inserted will, during the step-by-step advances of the ratchet 58, be successively brought into position for the entry of the blade 40 into the alternate slots for the insertion of the leads $a^2$. The operation of pedal 56 is then continued to successively insert the leads $a^5$ in the slots $b^2$ and to sever the excessive ends from the leads and form the leads as before described. Latch 34 is then disengaged from the commutator and withdrawn from the slot 25 in sleeve 17 so a lead can be inserted in the registering slot $b^2$ of the commutator.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a machine of the character described, the combination of means for rotatably supporting an assembled commutator having slotted segments and an armature comprising coils and leads extending from the coils, said supporting means comprising a sleeve fitting around the commutator and having slots therein adapted to register with the slots in the segments, means for successively securing leads in the slots in the segments, and mechanism for rotating the supporting means step-by-step to successively bring the slots in the sleeve into operative position for the securing means.

2. In a machine of the character described, the combination of means for rotatively supporting an assembled commutator having slotted segments and an armature comprising coils and leads extending from the coils, said supporting means comprising a sleeve fitting around the commutator and having slots therein adapted to register with the slots in the segments, means for successively securing leads in the slots in the segments, and mechanism for rotating the supporting means step-by-step to successively bring alternate slots in the sleeve into position for the connection of a lead to a commutator segment.

3. In a machine of the character described, the combination of means for rotatably supporting an assembled commutator having slotted segments and an armature comprising coils and leads extending from the coils, said supporting means comprising a sleeve fitting around the commutator and having slots therein adapted to register with the slots in the segments, a blade for successively securing leads in the slots in the segments, mechanism for imparting strokes to the blade, and mechanism also operated by the mechanism for imparting strokes to the blade for rotating the supporting means step-by-step to bring alternate slots in the sleeve into operative position for the connection of a lead to a commutator segment for each operative stroke of the blade.

4. In a machine of the character described, the combination of means for rotatably supporting an assembled commutator having slotted segments and an armature comprising coils and leads extending from the coils, said supporting means comprising a sleeve fitting around the commutator and provided with slots registering with the slots in the segments, means for successively connecting leads placed in the slots of the sleeve to the commutator segments, means for rotating the sleeve step-by-step to bring alternate slots in the sleeve into position for the connection of the leads to the segments, and means for adjusting the advancing mechanism to rotate the sleeve to position the commutator for inserting leads into intermediate segments.

5. In a machine of the character described, the combination of means for rotatably supporting an assembled commutator having slotted segments and an armature comprising coils and leads extending from the coils, means for rotating said supporting means step-by-step to bring slots in the segments into position for the connection of the leads to the segments, a blade for inserting leads into the segments, reciprocating means for operating the blade, a former situated in the path of reciprocation of said reciprocating operating means and operable by contact therewith for shaping the leads between the commutator and the adjacent end of the armature, and means for movably supporting the former so it may be so situated or moved out of said path and thereby be disengaged from the reciprocating operating means.

6. In a machine of the character described, the combination of means for rotatably supporting an assembled commutator having slotted segments and an armature comprising coils and leads extending from the coils, said supporting means comprising a sleeve having slots registering with the slots in the segments, a blade for successively connecting the leads to the segments, an arm on which the blade is supported, means for manually imparting strokes to the arm to operate the blade, means for rotating the sleeve step-by-step to successively bring slots in the sleeves and segments into operative relation with the blade, and a former for shaping the leads adjacent the commutator, operable by said arm, and pivotally mounted so it may be swung away from the arm.

7. In a machine of the character described, the combination of means for rotatably supporting an assembled commutator having slotted segments and an armature comprising coils and leads extending from the coils, a movable arm, manually operated means for imparting strokes to the arm, a blade carried by the arm for successively placing the leads in the slots in the segments, a pneumatic hammer mounted on the arm for imparting a rapid succession of blows to the blades to drive the leads further into the slots in the segments after they have been placed in the slots, a valve for controlling the hammer, and means on said arm adapted to contact said valve after a predetermined movement of said arm for starting the operation of said pneumatic hammer.

8. In a machine of the character described, the combination of means for rotatably supporting an assembled commutator having slotted segments and an armature comprising coils and leads extending from the coils, a movable arm, manually operated means for imparting strokes to the arm, a blade carried by the arm for successively placing the leads in the slots in the segments and provided with a cutting edge for severing the leads in the slots, a pneumatic hammer mounted on the arm for imparting a rapid succession of blows to the blade to drive the leads further into the slots in the segments after they have been placed in the slots and to sever ends from the leads in the slots, a valve for controlling the hammer, and means on said arm adapted to contact said valve after a predetermined movement of said arm for starting the operation of said pneumatic hammer.

JASPER F. CULLIN.